US009513937B2

(12) United States Patent
Chen et al.

(10) Patent No.: US 9,513,937 B2
(45) Date of Patent: Dec. 6, 2016

(54) METHOD AND CLIENT FOR USING AN EMBEDDED ACTIVEX PLUG-IN IN A BROWSER

(71) Applicant: BEIJING QIHOO TECHNOLOGY COMPANY LIMITED, Beijing (CN)

(72) Inventors: Zhi Chen, Beijing (CN); Jinwei Li, Beijing (CN); Yuesong He, Beijing (CN); Yu Fu, Beijing (CN); Huan Ren, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 0 days.

(21) Appl. No.: 14/431,969

(22) PCT Filed: Sep. 6, 2013

(86) PCT No.: PCT/CN2013/083077
§ 371 (c)(1),
(2) Date: Mar. 27, 2015

(87) PCT Pub. No.: WO2014/048240
PCT Pub. Date: Mar. 4, 2014

(65) Prior Publication Data
US 2015/0242222 A1    Aug. 27, 2015

(30) Foreign Application Priority Data

Sep. 28, 2012    (CN) .......................... 2012 1 0371228

(51) Int. Cl.
*G06F 9/445*    (2006.01)
*G06F 9/455*    (2006.01)
(52) U.S. Cl.
CPC ............. *G06F 9/44526* (2013.01); *G06F 8/65* (2013.01); *G06F 9/45529* (2013.01)

(58) Field of Classification Search
CPC .......... G06F 9/44526; G06F 9/65; G06F 8/65
See application file for complete search history.

(56) References Cited

U.S. PATENT DOCUMENTS 7,882,501 B1 *   2/2011   Carlson ..................... G06F 8/67
                                                         709/203
2002/0007357 A1 *   1/2002   Wong ................... G06F 9/44526
(Continued)

OTHER PUBLICATIONS

Lin, C.Y. et al, English abstract only of Chinese application No. CN1713573 A, Realization and realizing device for selective download from webpage inserted piece, publication date Dec. 28, 2005, one page.

(Continued)

*Primary Examiner* — Chameli Das
(74) *Attorney, Agent, or Firm* — James M. Stipek; John R. Bednarz; Polsinelli PC

(57) ABSTRACT

The invention discloses a method and client for using an embedded ActiveX plug-in in a browser. The method comprises: detecting that the browser is to load an ActiveX plug-in; judging whether the ActiveX plug-in has already been installed in a computer system where the browser is currently located; if it is determined that the ActiveX plug-in has already been installed in the computer system, intercepting the loading information about the ActiveX plug-in and loading the ActiveX plug-in embedded in the browser; and if it is determined that the ActiveX plug-in has not been installed in the computer system, generating a specific registry key value related to the embedded ActiveX plug-in, and loading the ActiveX plug-in embedded in the browser according to the specific registry key value.

12 Claims, 4 Drawing Sheets

(56) References Cited

U.S. PATENT DOCUMENTS

| | | | |
|---|---|---|---|
| 2004/0031030 A1* | 2/2004 | Kidder | G06F 1/14 |
| | | | 717/172 |
| 2004/0201604 A1* | 10/2004 | Kraenzel | G06Q 10/10 |
| | | | 715/700 |
| 2005/0108033 A1 | 5/2005 | Everett-Church | |
| 2007/0005685 A1* | 1/2007 | Chau | G06Q 20/04 |
| | | | 709/203 |
| 2007/0174424 A1* | 7/2007 | Chen | G06F 9/44526 |
| | | | 709/217 |
| 2009/0287559 A1* | 11/2009 | Chen | G06F 17/30867 |
| | | | 705/14.23 |
| 2010/0275018 A1* | 10/2010 | Pedersen | G06T 19/00 |
| | | | 713/168 |
| 2010/0275024 A1* | 10/2010 | Abdulhayoglu | G06F 21/6218 |
| | | | 713/175 |
| 2011/0126192 A1* | 5/2011 | Frost | G06F 8/61 |
| | | | 717/178 |

OTHER PUBLICATIONS

Lin, S. et al, English abstract only of Chinese application No. CN101551753 A, Device for controlling loading of plug-in and method, publication date Oct. 7, 2009, one page.

Satoshi, H. et al, English abstract only of Japanese application No. JP2004-145604 A, Browser Terminal and Browser Program, publication date May 20, 2004, one page.

International Search Report regarding PCT/CN2013/083077, issued Nov. 14, 2013, 4 pages.

* cited by examiner

METHOD AND CLIENT FOR USING AN EMBEDDED ACTIVEX PLUG-IN IN A BROWSER

CROSS-REFERENCE TO RELATED APPLICATIONS

This application is a national stage entry under 35 U.S.C. §371 of International Application No. PCT/CN2013/083077 filed Sep. 6, 2013, which claims priority to Chinese Application No. 201210371228.2 filed Sep. 28, 2012, the contents of all of which are incorporated herein by reference.

FIELD OF THE INVENTION

The present disclosure relates to the filed of computer technology, and in particular, to a method and client for using an embedded ActiveX plug-in in a browser.

BACKGROUND OF THE INVENTION

With the rapid development of the Internet, an ActiveX plug-in based on ActiveX also has more and more extensive applications. The ActiveX plug-in technology is an internationally common software technology based on the Windows platform, and much software is developed using such a way, for example, the Flash animation player plug-in, the Microsoft Media Player plug-in, the Adobe PDF reader plug-in, etc.

The ActiveX plug-in is called an OLE plug-in or OCX plug-in, and it is some software components or objects, which may be inserted into a WEB page or other application. For example, when a user browses to a specific webpage, the browser will prompt the user to download and install an ActiveX plug-in.

In the prior art, if a certain webpage is set to use a certain ActiveX plug-in, then when the user opens the webpage to trigger the use of the ActiveX plug-in, if the ActiveX plug-in is installed in the computer system, the browser will load the ActiveX plug-in installed in the computer system; if not installed in the computer system, it is necessary to write registry information related to this ActiveX plug-in to the registry according to the CLSID of the ActiveX plug-in, for example, the disk path of the ActiveX plug-in, and it can be used only after the computer system has finished the installation of the ActiveX plug-in.

However, in the course of the installation and invocation of an ActiveX plug-in in the prior art, it is possible to encounter computer system instability, which in turn affects the experience of a user when the user uses a browser to browse a webpage. Therefore, there is a need for a method for avoiding the use of an ActiveX plug-in installed in a computer system and implementing the embedding of an ActiveX plug-in in a browser, thereby increasing the stability of the computer system and improving the user's experience.

SUMMARY OF THE INVENTION

In view of the above problems, the present disclosure is proposed to provide a method, client and program for using an embedded ActiveX plug-in in a browser which overcome the above problems or at least in part solve the above problems.

According to an aspect of embodiments of the present disclosure, there is provided a method for using an embedded ActiveX plug-in in a browser, which comprises: detecting that the browser is to load an ActiveX plug-in; judging whether the ActiveX plug-in has already been installed in a computer system where the browser is currently located; if it is determined that the ActiveX plug-in has already been installed in the computer system, intercepting the loading information about the ActiveX plug-in and loading the ActiveX plug-in embedded in the browser; and if it is determined that the ActiveX plug-in has not been installed in the computer system, generating a specific registry key value related to the embedded ActiveX plug-in, and loading the ActiveX plug-in embedded in the browser according to the specific registry key value.

Correspondingly, the present disclosure further provides a client in which an ActiveX plug-in is embedded comprising: a detecting module configured to detect that a browser is to load an ActiveX plug-in; a judging module configured to judge whether the ActiveX plug-in has already been installed in a computer system where the client is currently located; a first loading module configured to: if it is determined that the ActiveX plug-in has already been installed in the computer system, intercept the loading information about the ActiveX plug-in and load the ActiveX plug-in embedded in the browser; and a second loading module configured to: if it is determined that the ActiveX plug-in has not been installed in the computer system, generate a specific registry key value related to the embedded ActiveX plug-in, and load the ActiveX plug-in embedded in the browser according to the specific registry key value.

According to yet another aspect of the embodiments of the present disclosure, there is provided a computer program comprising a computer readable code which causes a user terminal to perform the method for using an embedded ActiveX plug-in in a browser according to any of claims 1-9, when said computer readable code is running on the user terminal.

According to still another aspect of the embodiments of the present disclosure, there is provided a computer readable medium storing the computer program as claimed in claim 17 therein.

The beneficial effects of the present disclosure lie in that: compared to the prior art, the technical solution according to the embodiments of the present disclosure avoids the use of an ActiveX plug-in installed in a computer system, implements the embedding and invocation of an ActiveX plug-in in a browser, solves the problem of instability of the computer system due to the installation or invocation of the ActiveX plug-in in the computer system, and also causes that when using an ActiveX plug-in to parse and display a corresponding webpage element, for example, a text file, video file, audio file with a specific format, the browser may rapidly and stably load and invoke a corresponding ActiveX plug-in and finish displaying and playing it in the browser. Furthermore, a browser security risk is also avoided which is incurred since the version of the ActiveX plug-in does not match the computer system, or the version of the downloaded and installed ActiveX plug-in is a version which is issued by a non-official website and modified maliciously.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. Therein.

DETAILED DESCRIPTION OF THE INVENTION

In the following the invention will be further described in connection with the drawings and the particular embodiments.

With reference to embodiments of the invention, there are provided a method and client for embedding an ActiveX plug-in in a browser. The method implements the embedding of an ActiveX plug-in in a browser by detecting that the browser is to load an ActiveX plug-in, judging whether the ActiveX plug-in has already been installed in a computer system, and employing different ways according the judgment result to ultimately load the ActiveX plug-in embedded in the browser, thereby avoiding running a plug-in in the computer system and thus the problem of instability of the computer system resulted from the plug-in running in the computer system, and enhancing the stability of the computer system.

In order to make the objects, technical solutions and advantages of the invention more clear, the invention will be further described in detail in the following with reference to the drawings and particular embodiments.

According to embodiments of the present disclosure, there are provided a method and client for using an embedded ActiveX plug-in in a browser.

Figure 1:
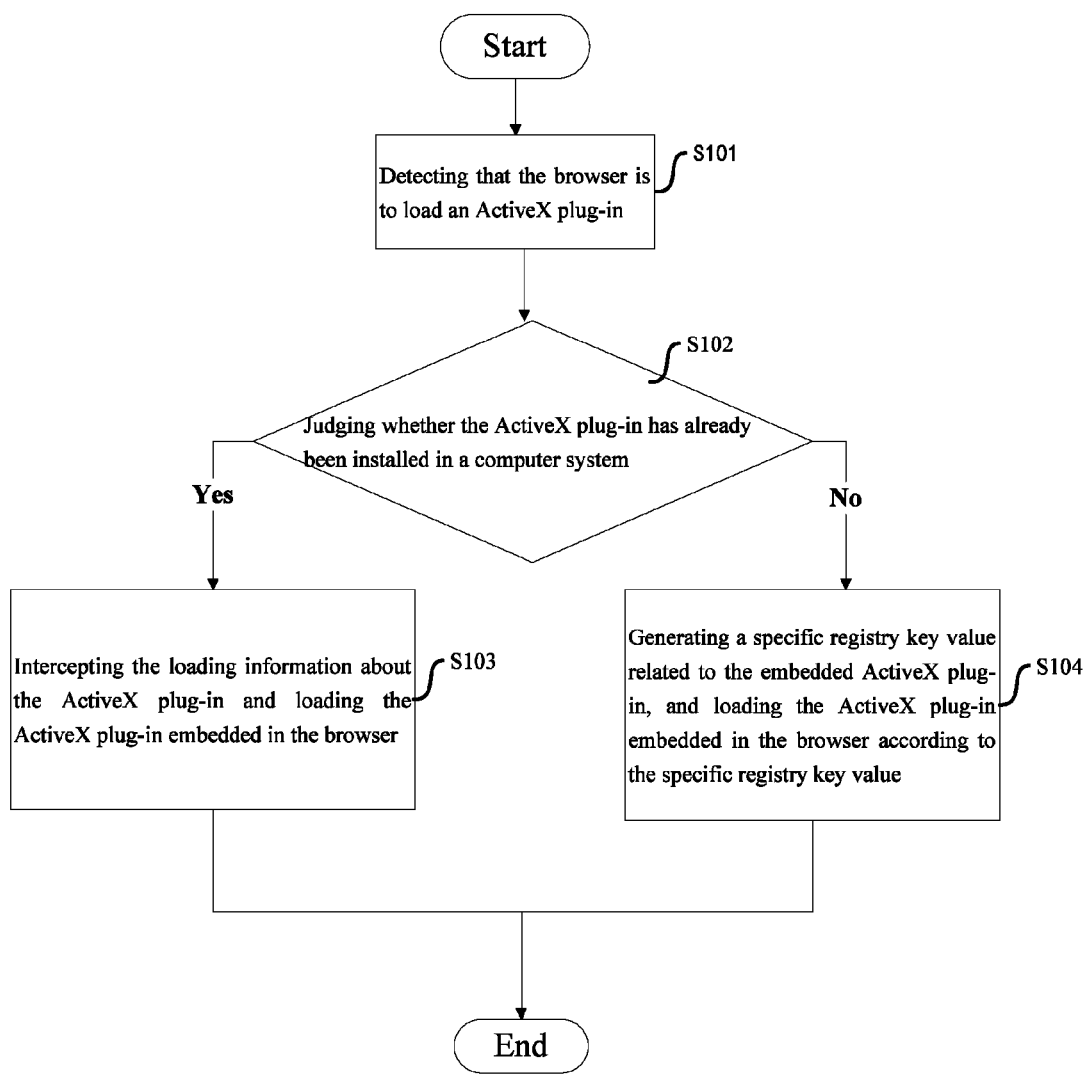
FIG. 1 is a flow chart of a method for using an embedded ActiveX plug-in in a browser according to an embodiment of the invention.

With reference to FIG. 1, FIG. 1 is a flow chart of a method for using an embedded ActiveX plug-in in a browser according to an embodiment of the present disclosure.

At step 101, it is detected that the browser is to load an ActiveX plug-in.

For example, when a browser is utilized to browse a webpage, sometimes the browser is needed to load an ActiveX plug-in so as to be able to display the webpage correctly. Therefore, it is first detected that the browser is to load an ActiveX plug-in.

Then, at step 102, it is judged whether the ActiveX plug-in has already been installed in a computer system. After it is detected that the browser is to load an ActiveX plug-in, the method of the invention in turn judges whether the ActiveX plug-in has already been installed in a computer system. Generally, it can be judged whether the ActiveX plug-in has already been installed in the computer system according to the class identifier (CLSID) of the ActiveX plug-in. In practice, for each ActiveX plug-in, there is a corresponding unique class identifier (CLSID, also called global unique identifier). Therefore, it may be checked and judged whether the plug-in has already been installed in the computer system utilizing the correspondence between the class identifier and the ActiveX plug-in. The class identifier (CLSID) may be a 128-bit random number. In order to ensure its randomness and avoid repetition, its algorithm may for example come from two aspects: one part of the digits of the class identifier comes from the serial number of the network card of the computer system; and the other part of the digits of the class identifier comes from the current time of the computer system.

Furthermore, the class identifier may be obtained based on a program identifier in a class identifier obtaining function. In particular, a request may be triggered for invoking the class identifier obtaining function, in the request, the program identifier corresponding to the ActiveX plug-in is included; then, the class identifier obtaining function is intercepted so as to obtain the program identifier, and then a recorded class identifier corresponding to the ActiveX plug-in is obtained according to the program identifier. The composition of a program identifier (ProgID) may be of the following form: <program>.<component>.<version>.

If at step 102 it is determined that the ActiveX plug-in has already been installed in the computer system, then at step 103 the loading information about the ActiveX plug-in is intercepted and the ActiveX plug-in embedded in the browser is loaded.

In particular, if the ActiveX plug-in has already been installed in the computer system, then the method may obtain the storage path of the ActiveX plug-in embedded in the browser by hooking a storage path query function (CoGetClassObject) of the ActiveX plug-in and according to the class identifier (CLSID) of the ActiveX plug-in. Afterwards, the ActiveX plug-in embedded in the browser is loaded based on the storage path. Furthermore, a dynamic link library loading function may be invoked to load the dynamic link library of the embedded ActiveX plug-in (LoadLibrary). That is to say, the browser obtains a class factory pointer by invoking an export function (DllGetClassObject). For example, the class factory pointer may be an IUnkown pointer corresponding to the ActiveX plug-in. Then, based on the class factory pointer, the ActiveX plug-in embedded in the browser is created and loaded. According to an implementation of the present disclosure, the ActiveX plug-in embedded in the browser is an installation-free ActiveX plug-in.

When a corresponding plug-in has not been installed in the computer system, it is necessary to redirect all the registries which need to be used in the operational process, to enable them to operate correctly. For example, the registries that need to be accessed when the browser loads a plug-in comprise CLSID and TypeLib, etc., and if there is not a corresponding key value present in the computer system, the browser will not perform a subsequent creation process. Therefore, according to the method of the present disclosure, if it is determined that the ActiveX plug-in has not been installed in the computer system, then at step 104 a specific registry key value related to the embedded ActiveX plug-in is generated, and the ActiveX plug-in embedded in the browser is loaded according to the specific registry key value. According to an implementation of the present disclosure the ActiveX plug-in embedded in the browser is an installation-free ActiveX plug-in.

More particularly, loading the ActiveX plug-in embedded in the browser according to the specific registry key value may further comprise: placing the storage path of the ActiveX plug-in embedded in the browser under the specific registry key value; loading the ActiveX plug-in embedded in the browser based on the storage path of the ActiveX plug-in embedded in the browser.

More particularly, the loading the ActiveX plug-in embedded in the browser based on the storage path of the ActiveX plug-in embedded in the browser may comprise: by hooking a registry reading function, accessing to the specific registry key value to redirect it to the storage path of the ActiveX plug-in embedded in the browser, thereby loading the ActiveX plug-in embedded in the browser.

Figure 2:
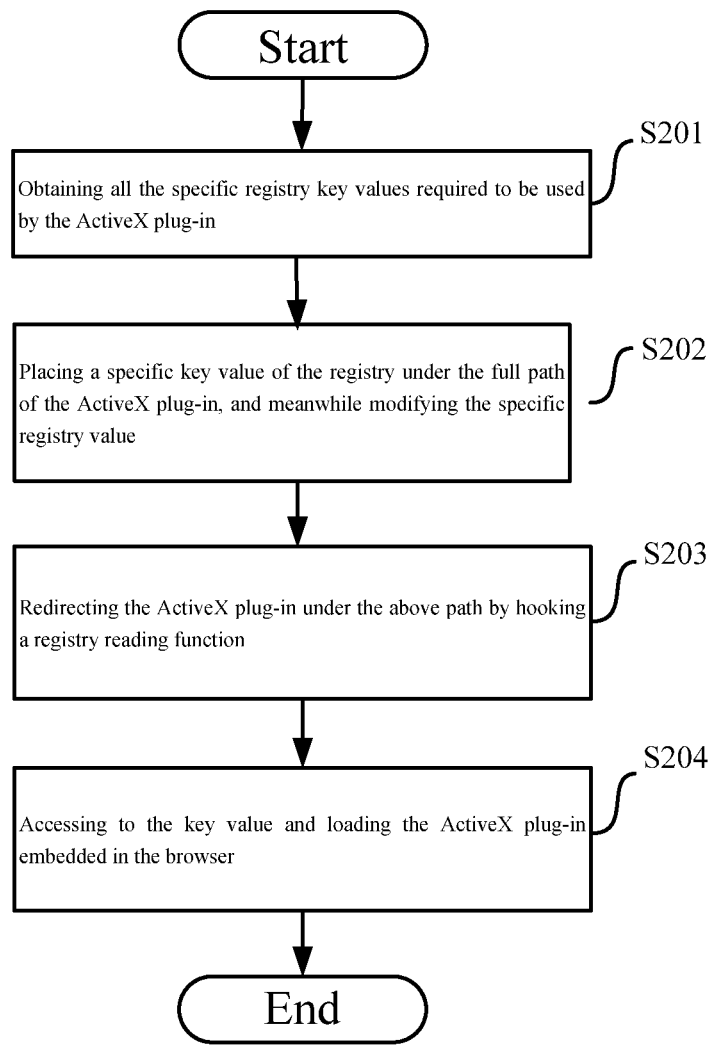
FIG. 2 is a flow chart of a method for using an embedded ActiveX plug-in in a browser when a corresponding plug-in has not been installed in a computer system according to a specific embodiment of the invention.

In order to still further understand a flow chart of the method of the present disclosure when a corresponding plug-in has not been installed in the computer system, the above case when a corresponding plug-in has not been installed in the computer system will be further described in the following with reference to FIG. 2.

As described above, as shown in FIG. 2, for example, first, at step 201, the method obtains all the specific registry key values (not including a key value unrelated to the plug-in, since the registry value has already been in the computer system) required to be used by the ActiveX plug-in, for example, obtains the registry key values required to be used by a flash plug-in. At step 202, the full path of the ActiveX plug-in is placed under a specific key value of the registry. For example, it may be placed under e.g., the path HKEY_CLASS_ROOT\ . . . \FlashStub, and at the same time, the specific registry key is modified. According to an embodiment of the present disclosure, the full path of the ActiveX plug-in may be created as needed. After that, at step 203, by hooking a registry reading function, for example, the registry reading function may be RegOpenKeyEx or RegQueryValueEx, when the key value accessed by it needs to be redirected, it is redirected under the above path FlashStub. Thus, at step 204, the key value is accessed, and the ActiveX plug-in embedded in the browser is loaded, namely, the flash plug-in. In the end, although the ActiveX plug-in has not been installed in the computer system, the embedding of the ActiveX plug-in in the browser is implemented by registry redirection, and it is invoked, such that transparent access is enabled, and the browser is made to run in an environment identical to one in which the flash plug-in is installed in the computer system.

In the embodiment of the present disclosure, the Flash plug-in, a browser-side ActiveX plug-in, is taken as an example to exemplarily describe some detailed operations of the present disclosure, however, it should be understood that the technical solution of the invention is also applicable to any other browser-side ActiveX plug-in.

According to an embodiment of the present disclosure, for example, the registry required to be accessed when the browser loads the plug-in may be CLSID, and then the corresponding key values are as follows.

HKEY_CLASSES_ROOT\CLSID\{D27CDB6E-AE6D-11cf-96B8-444553540000}\InprocServer32, which key value indicates the key value of InprocServer32. A browser object label accesses to InprocServer32 via CLSID to obtain the installation position of the flash plug-in, and then the method of the present disclosure redirects the position of the flash plug-in to the position of the flash plug-in embedded in the browser by hooking the registry obtaining function;

HKEY_CLASSES_ROOT\CLSID\{D27CDB6E-AE6D-11cf-96B8-444553540000}\ProgID, which key value indicates the ProgID of the flash plug-in. A browser javascript code needs to obtain the ProgID of the flash when creating a new flash object via a new ActivexObject code, and then the method of the invention redirects the ProgID to the above path by hooking the registry reading function;

HKEY_CLASSES_ROOT\CLSID\{D27CDB6E-AE6D-11cf-96B8-444553540000}\MiscStatus, which key value indicates the key value of MiscStatus. An ole object obtains attributes of a com object by reading the key value of MiscStatus to parse the object, and likewise, the registry reading function is hooked to redirect it to the above path to access to its key value; and HKEY_CLASSES_ROOT\CLSID\{D27CDB6E-AE6D-11cf-96B8-444553540000}\Implemented Categories, which key value is one indicating the security attribute of an active object, and likewise, the registry reading function is hooked to redirect it to the above path for access.

Figure 3:
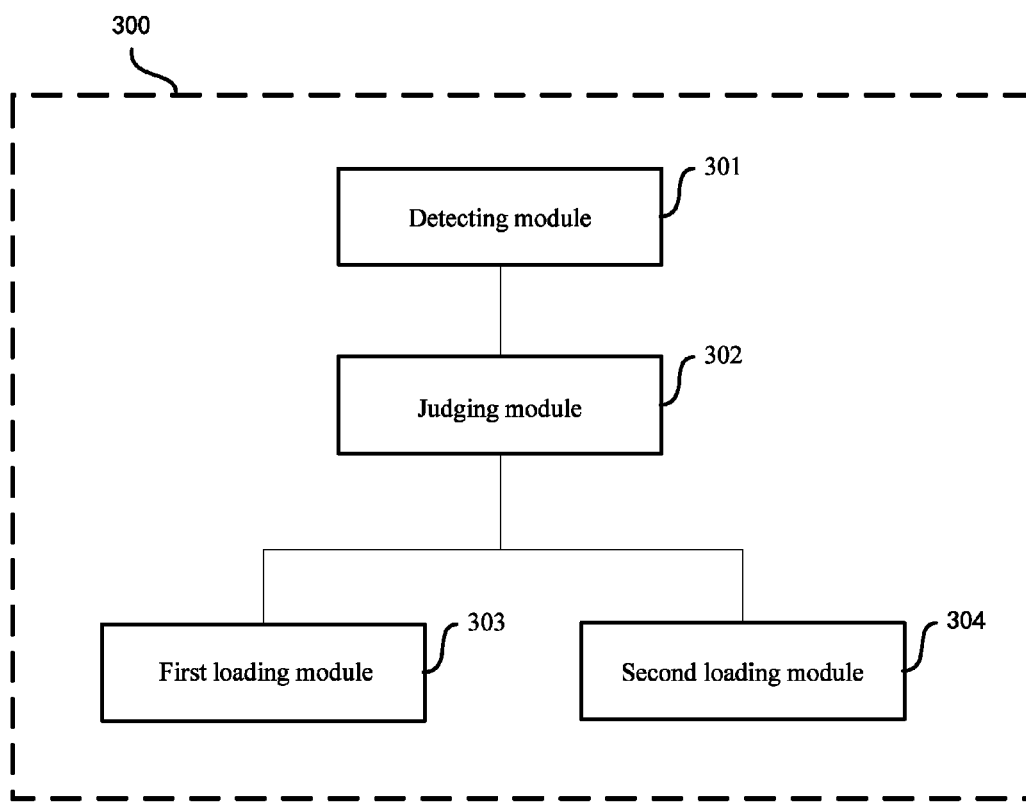
FIG. 3 is a block diagram of a client 300 in which an ActiveX plug-in is embedded according to an embodiment of the invention.

FIG. 3 is a block diagram of a client 300 in which an ActiveX plug-in is embedded according to an embodiment of the present disclosure.

According to an embodiment of the present disclosure, the client 300 in which an ActiveX plug-in is embedded may comprise a detecting module 301, a judging module 302, a first loading module 303 and a second loading module 304.

According to an embodiment of the present disclosure, when a browser is utilized to browse a webpage, the detecting module 301 included in the client 300 may detect that the browser is to load an ActiveX plug-in. Once it is detected that a plug-in is to be loaded, the judging module 302 may judge whether the ActiveX plug-in has already been installed in a computer system. In general, it can be judged whether the ActiveX plug-in has already been installed in the computer system according to the class identifier (CLSID) of the ActiveX plug-in. The client may further comprise a class identifier obtaining module (not shown) configured to obtain the class identifier based on a program identifier in the class identifier obtaining module. The way of how to obtain the class identifier according to the program identifier may for example be referred to what is described with reference to FIG. 1, and the detailed description thereof will be omitted here for avoiding repetition.

If the judging module 302 determines that the ActiveX plug-in has already been installed in the computer system, then the first loading module 303 may be configured to intercept the loading information about the ActiveX plug-in and load the ActiveX plug-in embedded in the browser. If the judging module 302 determines that the ActiveX plug-in has not yet been installed in the computer system, then the second loading module 304 may be configured to generate a specific registry key value related to the embedded ActiveX plug-in, and load the ActiveX plug-in embedded in the browser according to the specific registry key value.

The first loading module 303 may comprise a path obtaining sub-module and a first loading sub-module. The path obtaining sub-module may be configured to obtain the storage path of the ActiveX plug-in embedded in the browser by hooking a storage path query function of the ActiveX plug-in and according to the class identifier of the ActiveX plug-in. Afterwards, the first loading sub-module may be configured to load the ActiveX plug-in embedded in the browser based on the storage path.

The client according to the present disclosure may further comprise: a dynamic link library loading sub-module (not shown), which may be configured to invoke a dynamic link library loading function to load the dynamic link library of the embedded ActiveX plug-in; an obtaining sub-module (not shown), which may be configured to obtain a class factory pointer by invoking an export function; a creating & loading sub-module (not shown), which may be configured to create and load the ActiveX plug-in embedded in the browser based on the class factory pointer. According to an implementation of the present disclosure, the ActiveX plug-in embedded in the browser is an installation-free ActiveX plug-in.

In the client of the present disclosure, the second loading module 304 may further comprise a placing module and a second loading sub-module, wherein the placing module may be configured to place the storage path of the ActiveX plug-in embedded in the browser under the specific registry key value, and then the second loading sub-module may be configured to load the ActiveX plug-in embedded in the browser based on the storage path of the ActiveX plug-in embedded in the browser. According to an implementation of the present disclosure, the ActiveX plug-in embedded in the browser is an installation-free ActiveX plug-in.

Furthermore, the second loading sub-module may comprise a redirecting module which may be configured to, by hooking a registry reading function, access to the specific registry key value to redirect the registry reading function to the storage path of the ActiveX plug-in embedded in the browser, such that the second loading sub-module loads the ActiveX plug-in embedded in the browser.

The functions realized by the individual modules contained in the client 300 according to the present disclosure correspond to the steps of the method according to the present disclosure described with reference to FIG. 1, and therefore the detailed description thereof will be omitted here for avoiding repetition.

According to an embodiment of the present disclosure, the first loading module and the second loading module may be merged into a single loading module (not shown) to load the ActiveX plug-in. Thus, in an example in which a single loading module is formed by merging, furthermore, the first loading sub-module and the second loading sub-module may also be merged into a single loading sub-module.

The algorithms and displays provided here are not inherently related to any specific computer, virtual system or other device. Various general-purpose systems may also be used with the teachings herein. According to the above description, the structure required for constructing such systems is obvious. In addition, the invention is not directed to any specific programming language. It should be understood that the content of the invention described herein may be carried out utilizing various programming languages, and that the above description for a specific language is for the sake of disclosing preferred embodiments of the invention.

For a device embodiment, it is described relatively simply due to its essential similarity to a method embodiment, and as for its relevant parts reference may be made to the description of the parts of the method embodiment.

The individual embodiments in the specification are described using a progressive manner, each embodiment highlights its difference from other embodiments, and identical or similar parts of the individual embodiments may be referred relative to each other.

Embodiments of the individual components of the invention may be implemented in hardware, or in a software module running on one or more processors, or in a combination thereof. It will be appreciated by those skilled in the art that, in practice, some or all of the functions of some or all of the components in a client device in which an ActiveX plug-in is embedded according to individual embodiments of the invention may be realized using a microprocessor or a digital signal processor (DSP). The invention may also be implemented as a device or apparatus program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 4:
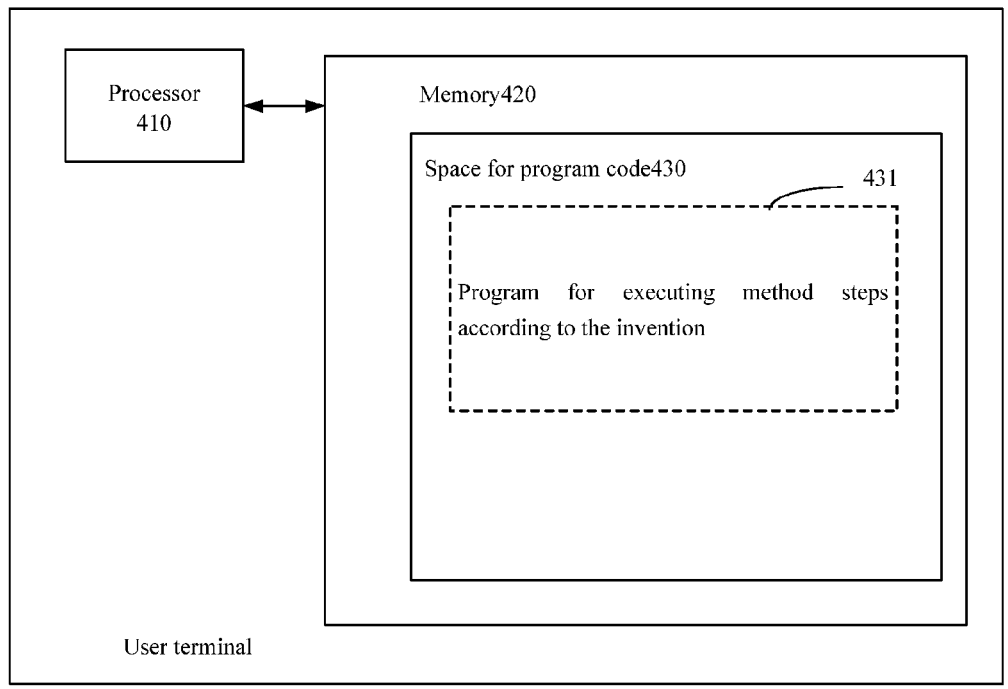
FIG. 4 shows schematically a block diagram of a user terminal for performing a method according to the invention.
Figure 5:
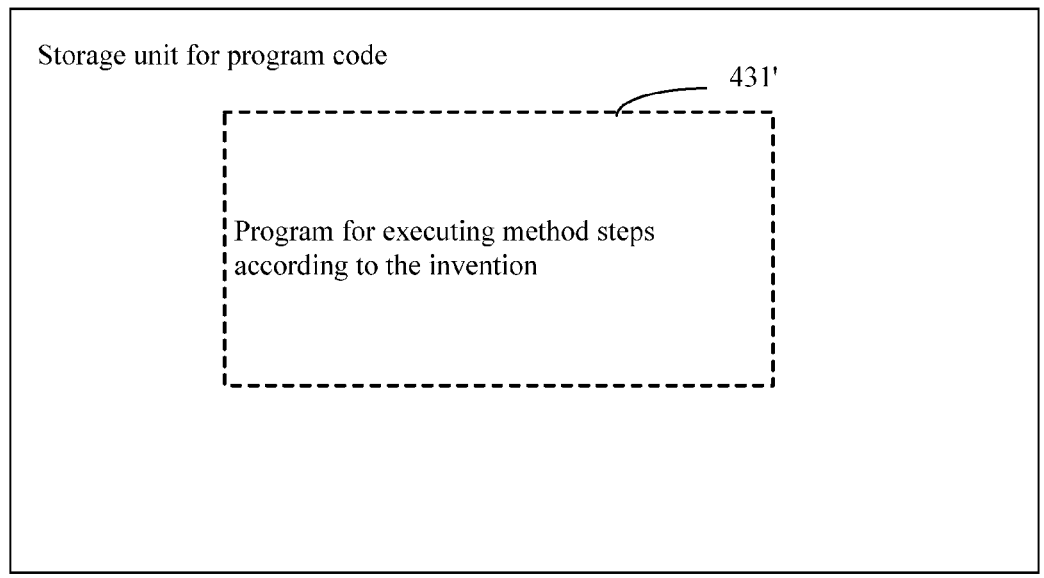
FIG. 5 shows schematically a storage unit for retaining or carrying a program code implementing a method according to the invention.

For example, FIG. 4 shows a user terminal which may carry out a method for using an embedded ActiveX plug-in in a browser according to the invention, e.g., an application server. The user terminal traditionally comprises a processor 410 and a computer program product or a computer readable medium in the form of a memory 420. The memory 420 may be an electronic memory such as a flash memory, an EEPROM (electrically erasable programmable read-only memory), an EPROM, a hard disk or a ROM. The memory 420 has a memory space 430 for a program code 431 for carrying out any method steps in the methods as described above. For example, the memory space 430 for a program code may comprise individual program codes 431 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 5. The storage unit may have a memory segment, a memory space, etc. arranged similarly to the memory 420 in the user terminal of FIG. 4. The program code may for example be compressed in an appropriate form. In general, the storage unit comprises a computer readable code 431', i.e., a code which may be read by e.g., a processor such as 410, and when run by a user terminal, the codes cause the user terminal to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several means, several of the means may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. A method for using an embedded ActiveX plug-in in a browser, comprising:
    detecting, by at least one processor, that the browser is to load an ActiveX plug-in;
    determining, by the at least one processor, whether the ActiveX plug-in has already been installed in a computer system where the browser is currently located;
    if it is determined that the ActiveX plug-in has already been installed in the computer system, intercepting, by the at least one processor, loading information about the ActiveX plug-in and loading the ActiveX plug-in embedded in the browser; and
    if it is determined that the ActiveX plug-in has not been installed in the computer system, generating, by the at least one processor, a specific registry key value related to the embedded ActiveX plug-in by placing a storage path of the ActiveX plug-in embedded in the browser under the specific registry key value, and loading the ActiveX plug-in embedded in the browser according to the specific registry key value and based on the storage path of the ActiveX plug-in embedded in the browser, a browser object label obtaining an installation position of the ActiveX plug-in via the specific registry key value by hooking a registry reading function, and accessing the specific registry key value to redirect from the installation position of the Active X plug-in to the storage path of the ActiveX plug-in embedded in the browser, thereby loading the ActiveX plug-in embedded in the browser.

2. The method according to claim 1, further comprising determining whether the ActiveX plug-in has already been installed in the computer system based on a class identifier of the ActiveX plug-in.

3. The method according to claim 2, wherein the class identifier is obtained based on a program identifier in a class identifier obtaining function.

4. The method according to claim 1, wherein the intercepting the loading information about the ActiveX plug-in and loading the ActiveX plug-in embedded in the browser comprises:
    obtaining the storage path of the ActiveX plug-in embedded in the browser by hooking a storage path query function of the ActiveX plug-in and according to a class identifier of the ActiveX plug-in; and
    loading the ActiveX plug-in embedded in the browser based on the storage path.

5. The method according to claim 4, further comprising:
    invoking a dynamic link library loading function to load the dynamic link library of the embedded ActiveX plug-in;
    obtaining a class factory pointer by invoking an export function; and
    creating and loading the ActiveX plug-in embedded in the browser based on the class factory pointer.

6. The method according to claim 1, further comprising: by hooking the registry reading function, accessing the specific registry key value of a program identifier to redirect to the storage path of the ActiveX plug-in embedded in the browser.

7. A client having an embedded ActiveX plug-in, comprising:
    a memory having instructions stored thereon; and
    at least one processor to execute the instructions to perform operations comprising:
        detecting that a browser is to load an ActiveX plug-in;
        determining whether the ActiveX plug-in has already been installed in a computer system where the client is currently located;
        if it is determined that the ActiveX plug-in has already been installed in the computer system, intercepting loading information about the ActiveX plug-in and loading the ActiveX plug-in embedded in the browser; and
        if it is determined that the ActiveX plug-in has not been installed in the computer system, generating a specific registry key value related to the embedded ActiveX plug-in by placing a storage path of the ActiveX plug-in embedded in the browser under the specific registry key value, and loading the ActiveX plug-in embedded in the browser according to the specific registry key value and based on the storage path of the ActiveX plug-in embedded in the browser, a browser object label obtaining an installation position of the ActiveX plug-in via the specific registry key value by hooking a registry reading function, and accessing the specific registry key value to redirect from the installation position of the Active X plug-in to the storage path of the ActiveX plug-in embedded in the browser, thereby loading the ActiveX plug-in embedded in the browser.

8. The client according to claim 7, the operations further comprising determining whether the ActiveX plug-in has already been installed in the computer system based on a class identifier of the ActiveX plug-in.

9. The client according to claim 8, wherein the class identifier is obtained based on a program identifier in a class identifier obtaining function.

10. The client according to claim 7, wherein the intercepting the loading information about the ActiveX plug-in and loading the ActiveX plug-in embedded in the browser comprises:
    obtaining the storage path of the ActiveX plug-in embedded in the browser by hooking a storage path query function of the ActiveX plug-in and according to a class identifier of the ActiveX plug-in; and
    loading the ActiveX plug-in embedded in the browser based on the storage path.

11. The client according to claim 10, the operations further comprising:
    invoking a dynamic link library loading function to load the dynamic link library of the embedded ActiveX plug-in;
    obtaining a class factory pointer by invoking an export function; and
    creating and loading the ActiveX plug-in embedded in the browser based on the class factory pointer.

12. A non-transitory computer readable medium having instructions stored thereon that, when executed by at least one processor, cause the at least one processor to perform operations for using an embedded ActiveX plug-in in a browser, the operations comprising:

detecting that the browser is to load an ActiveX plug-in;

determining whether the ActiveX plug-in has already been installed in a computer system where the browser is currently located;

if it is determined that the ActiveX plug-in has already been installed in the computer system, intercepting loading information about the ActiveX plug-in and loading the ActiveX plug-in embedded in the browser; and if it is determined that the ActiveX plug-in has not been installed in the computer system, generating a specific registry key value related to the embedded ActiveX plug-in by placing a storage path of the ActiveX plug-in embedded in the browser under the specific registry key value, and loading the ActiveX plug-in embedded in the browser according to the specific registry key value and based on the storage path of the ActiveX plug-in embedded in the browser, a browser object label obtaining an installation position of the ActiveX plug-in via the specific registry key value by hooking a registry reading function, and accessing the specific registry key value to redirect from the installation position of the Active X plug-in to the storage path of the ActiveX plug-in embedded in the browser, thereby loading the ActiveX plug-in embedded in the browser.

* * * * *